Oct. 20, 1925.  
F. W. HALL  
1,558,162  
REVIVIFYING FULLERS' EARTH  
Original Filed April 20, 1921
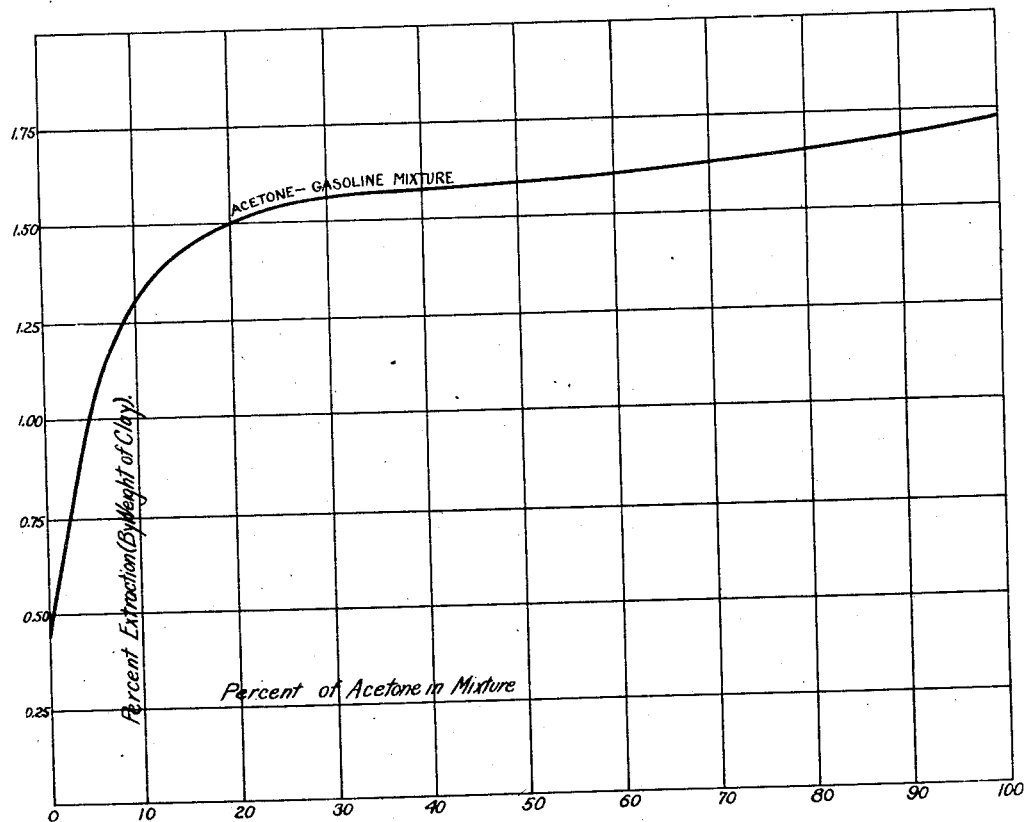

Patented Oct. 20, 1925.

1,558,162

UNITED STATES PATENT OFFICE.

FRANK W. HALL, OF PORT ARTHUR, TEXAS, ASSIGNOR TO THE TEXAS COMPANY, OF NEW YORK, N. Y., A CORPORATION OF TEXAS.

REVIVIFYING FULLER'S EARTH.

Original application filed April 20, 1921, Serial No. 462,986. Divided and this application filed January 8, 1925. Serial No. 1,312.

*To all whom it may concern:*

Be it known that I, FRANK W. HALL, a citizen of the United States, residing in Port Arthur, county of Jefferson, and State of Texas, have invented certain new and useful Improvements in Revivifying Fuller's Earth, of which the following is a specification, reference being had to the accompanying drawing, forming a part thereof.

This invention, a division of my copending application, filed April 20, 1921, Serial No. 462,986, relates to methods of treating fuller's earth or other equivalent adsorbent material which has been used in the refining of hydrocarbon oils and contemplates a process of removing adsorbed oil and other occluded matter from the pores of the clay and the rejuvenation of the adsorbent qualities of the clay.

It is generally recognized that the coloring element in hydrocarbon oils consists of asphaltic material in colloidal form and when filtering these oils to improve the color thereof the colloidal asphalt is adsorbed in the pores of the filtering medium. In common practice the adsorptive clays generally referred to as fuller's earth which have been used in filtering petroleum oils are subjected to a treatment in which the spent clay is washed with gasolene or naphtha, steamed and then burned in a rotary kiln. Each time, however, that the clay is treated in this way its decolorizing qualities are greatly reduced and after a few burnings it is so greatly deteriorated that it is practically worthless for the usual filtering treatment of oils. The reduction in the adsorption qualities of the clay is due, no doubt, to the fact that the treatment with the oil solvent does not remove the occluded coloring matter from the pores of the earth particles, or at least removes but a very small proportion of the asphaltic material, and in the subsequent burning only the more exposed portions of the coloring matter are oxidized, a large part being carbonized within the pores of the clay. The only way in which the asphalt held in the interior interstices of the clay can be burned out is by distilling through the pores to the surface and in this distilling a large part of the asphalt is carbonized and retained within the pores. It would be impossible to remove all of the asphalt even by the use of high temperatures, but in any case such a method of procedure is not practicable because if the fuller's earth be heated excessively its adsorption properties are destroyed. It is thus apparent that after a very few treatments of the usual type the pores of the clay will have been choked with the coloring material and its adsorptive properties ruined.

I have discovered that the spent clay may be treated with some of the usual oil and asphalt solvents without any appreciable amount of asphalt being removed. This is apparently due to the fact that some solvents do not possess the peculiar properties required for extracting the asphalt from a porous material. I have found, however, that certain solvents, particularly certain mixed solvents, do possess the property of extracting this coloring matter.

If the used fuller's earth be treated with such solvents as acetone or alcohol the coloring matter may be readily extracted. The expense of these solvents, however, is ordinarily prohibitive of their use for revivifying fuller's earth used in the treating of hydrocarbon oils. I have discovered, however, that certain mixed solvents, containing only a relatively small proportion of an extracting solvent, such as acetone, and having a relatively large proportion of certain cheaper solvents, or liquids which under the conditions of use are by themselves relatively inert, may be used with equal if not better results than are obtainable by the use of one of the expensive solvents undiluted.

A graphic illustration of the extraction qualities of this solvent is shown in the single figure of the accompanying drawing. The curve indicates the per cent of asphalt extraction obtained by using varying proportions of acetone and gasolene, the proportions being stated volumetrically. It will be seen from the curve that a very marked increase of asphalt extraction occurs with the addition of small quantities of acetone up to 10 to 15% and that further increases in the acetone content do not increase the asphalt extraction to any great degree. In other words, the curve clearly shows that the mixed solvent, acetone and gasolene in which the acetone content may not exceed 10 to 15%, possesses almost as good extraction properties as a solvent containing greater proportions of the expensive liquid and in fact is almost equal in quality to undiluted acetone.

By reference to the graphic illustration it will be seen that the diluent of the extracting solvent used in this invention, viz, gasolene, although a solvent of asphaltic material, is in itself practically inert as regards the extraction of the coloring matter from the porous structure of the clay. When, however, this inactive solvent is mixed with the extracting solvent, even though relatively small portions of the latter be used, the resultant mixed solvent possesses efficient extraction properties, as is clearly indicated in the diagram.

In order to more fully disclose my invention I will now proceed to explain in detail a preferred method of operation: The spent clay which has been used in the filtering or refining of hydrocarbon oils is first steamed in order to remove as much entrained oil as possible. The steaming may be followed by a spray wash with gasolene or naphtha for the purpose of removing any oil remaining in the clay. The earth may then be steamed again to drive off the oil solvent after which it is given a spray wash with an extracting solvent, such as a mixture of acetone and gasolene, or other solvent that has the property of removing substantial proportions of the occluded asphalt. Another spray wash with gasolene or naphtha may then be given the clay in order to remove the extracting solvent after which the clay is steamed to remove the gasolene or naphtha and then blown with air until it is dry.

Inasmuch as this treatment removes substantially all the occluded asphalt from the clay it is not necessary to subject it to the usual burning. It is thus possible by means of my process to employ the clay repeatedly for filtering or treating hydrocarbon oils, the clay after each treatment being readily restored to its original adsorptive condition. If desired after a number of such treatments the clay may be burned and in this way the life of the clay is greatly prolonged.

Attention is directed to the fact that the steam used for heating the fuller's earth to drive off the entrained oil or the oil solvent is preferably superheated in order that the necessary heat may be applied without producing any excessive moisture in the clay. It is undesirable to have water particles remaining in the clay prior to the treatment with some of the color extracting solvents, e. g., when using a solvent containing acetone the clay should be as dry as possible in order to avoid the difficulty of separating the acetone from the water in the subsequent distilling to recover the solvent.

It is not necessary to use a solvent to remove the oil in the clay as substantially all the oil may be removed by heating with superheated steam, the small traces of oil remaining not interfering with the extraction of the coloring matter. Moreover the oil and coloring matter may be removed in a single step as a solvent capable of extracting the occluded asphalt will also dissolve the oil. The disadvantage in this method of procedure, however, resides in the fact that it is necessary to distill a greater volume of liquid for recovery of the solvent.

While this invention is applicable to the recovery and revivification of all types of decolorizing clays which have been used in refining hydrocarbon oils, it has a particular field of usefulness in the revivification of adsorbent clays which are of such composition that their active structure is destroyed when subjected to such temperatures as are used in the usual process of recovery by the direct application of heat.

Obviously the invention is not restricted to the specific mode of operation set forth, as the advantages and benefits thereof may be obtained to a greater or less degree by variations from the process herein disclosed in detail. Therefore, only such limitations should be employed as are indicated in the appended claims.

I claim:—

1. The process of treating decolorizing clay which has been used in refining hydrocarbon oil which comprises removing occluded coloring matter by treating with a solvent comprising acetone and gasolene.

2. The process of treating decolorizing clay which has been used in refining hydrocarbon oil which comprises removing occluded coloring matter by treating with a solvent comprising gasolene and acetone, in which the acetone content forms at least approximately 10 per cent by volume of the mixture.

3. The process of treating decolorizing clay which has been used in refining hydrocarbon oil, which comprises removing the occluded coloring matter by treating with a solvent comprising a large proportion of gasoline and a small proportion of acetone.

In witness whereof I have hereunto set my hand this 18th day of November, 1924.

FRANK W. HALL.